(No Model.)
H. D. T. WILSON.
ONE WHEEL VEHICLE.
No. 487,359.   Patented Dec. 6, 1892.
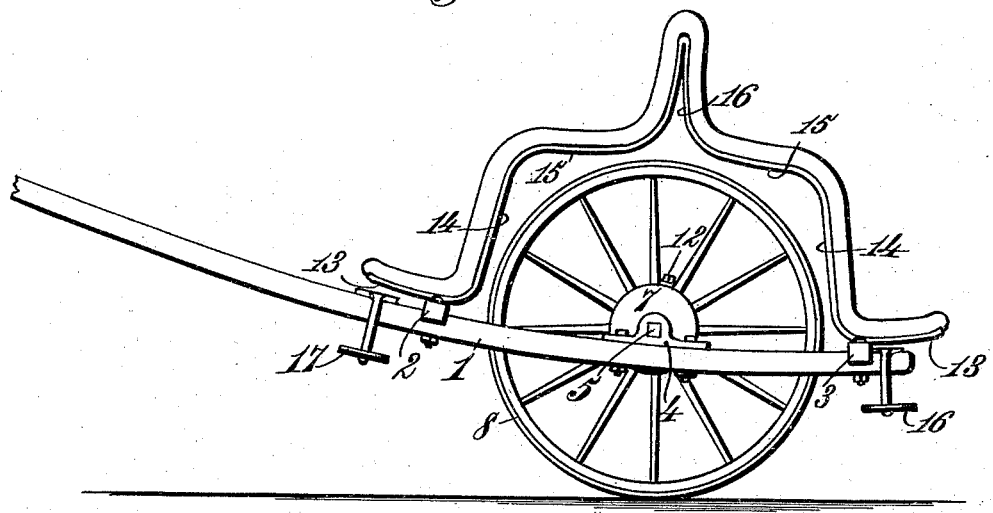
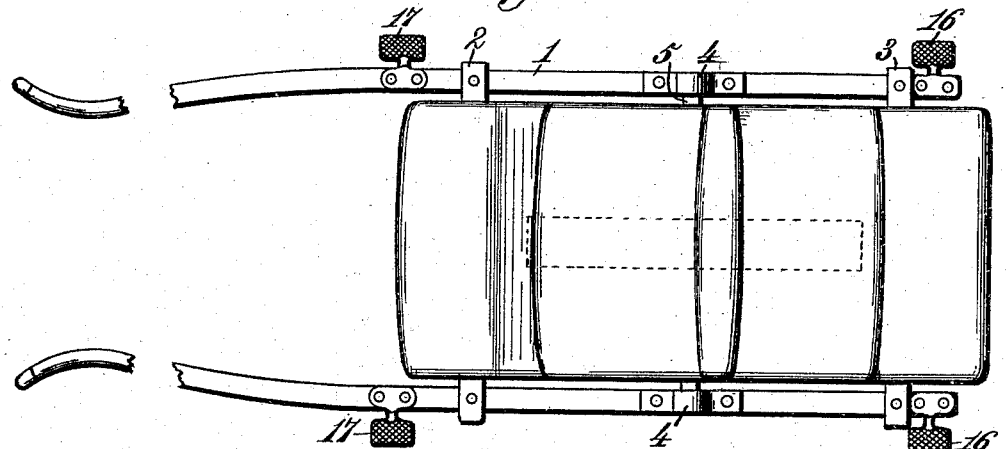
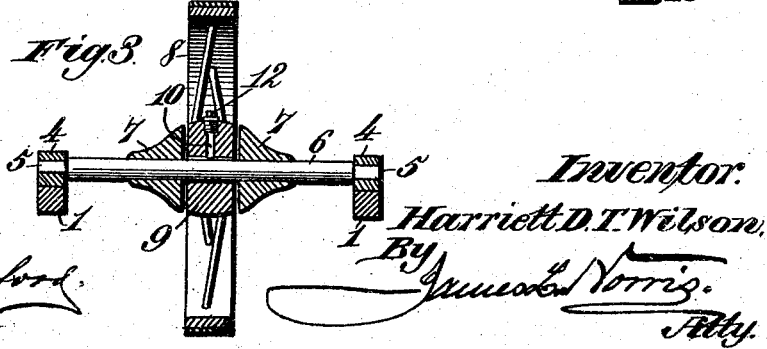
Witnesses.                                  Inventor.
Robert Everett,                           Harriett D. T. Wilson,
J. A. Rutherford.                    By James L. Norris.
                                               Atty.

UNITED STATES PATENT OFFICE.

HARRIETT D. T. WILSON, OF NEW YORK, N. Y.

ONE-WHEEL VEHICLE.

SPECIFICATION forming part of Letters Patent No. 487,359, dated December 6, 1892.

Application filed July 21, 1892. Serial No. 440,817. (No model.)

*To all whom it may concern:*

Be it known that I, HARRIETT D. T. WILSON, a citizen of the United States, residing at New York, in the county of New York and State of New York, have invented new and useful Improvements in One-Wheeled Vehicles, of which the following is a specification.

My invention relates to that class of vehicles in which the body is sustained by and travels upon a single central wheel, the equilibrium being preserved, as in the bicycle, by the revolution of the wheel, whereby if the center of gravity is displaced laterally it is constantly shifted from one side of the central line to the other and the upright position is maintained, this result being aided by as nearly equal a disposition of the load upon both sides of the true center as possible.

It is the purpose of my invention to provide a double seat having a novel, simple, and economical construction and supported by improved lateral frames so arranged as to bring the seat both fore and aft of the axle and assist in balancing the vehicle and in removing the dead-weight partly or wholly from the harness-saddle, thereby assisting in preserving the proper equilibrium by the shafts or thills through their connections with the saddle.
It is my purpose, also, to provide a vehicle of the type specified having two seats capable of accommodating four persons, one of said seats being in rear of the other and the two back to back, and so arranged with relation to the axle lying beneath that the balance of the vehicle upon said axle shall be preserved or promoted in a large measure, and dust and dirt shielded from the seats and from the persons sitting therein, while all danger of becoming entangled with the wheel is removed.

My invention includes, also, the provision of novel means whereby the strain upon the wheel shall be more nearly equalized and distributed over a greater area and whereby, also, the axle may be lubricated without removing the wheel therefrom.

The invention consists in the several novel features of construction and new combinations of parts hereinafter fully described, and then definitely pointed out in the claims annexed to this specification.

To enable others to understand and to make and use my said invention, I will proceed to describe the same in detail, reference being had to the accompanying drawings, in which—

Figure 1 is a side elevation of a vehicle constructed in accordance with my invention. Fig. 2 is a partial plan view of the same. Fig. 3 is a detail view showing the axle and wheel and the parts belonging thereto.

In the said drawings the reference-numeral 1 indicates the vehicle-frame, consisting of side and end bars 2 and 3, respectively, which are constructed, preferably, with a view to combining lightness with strength. The side bars 1 may, if desired, be mounted upon any suitable form of springs; but I prefer to locate the elasticity in the frames supporting the double seat both as a matter of economy and simplicity and in order that the axle may at all times remain in substantial parallelism with the end bars, thereby holding the wheel at a right angle with said bars under all circumstances. For these reasons I provide the side bars with any simple and suitable form of axle clips or keepers 4, in which are placed the extremities 5 of the axle 6, which is preferably rigid or without rotation. Upon the middle portion of said axle I rigidly mount equalizing lateral supports 7, each consisting of a conical or conoidal body formed of metal, wood, or other suitable material. The flat bases of these cones are pierced centrally by the rigid axle, and are separated by a space wide enough to admit the wheel 8 and permit its free revolution. This wheel is provided with a hub or center 9 of such diameter relatively to the flat parallel faces of the cones that it may receive support thereon against all lateral strains.

In order to lubricate the wheel and axle, I form an oil-opening 10 in the hub of the wheel and close the same by a screw-plug 12. By simply removing the latter oil may be supplied in a suitable quantity and retained by replacing the screw-plug.

The double seat is supported upon two open or skeleton frames, each consisting of a short horizontal or nearly horizontal bar 13, connected by a vertical bar 14 with the seat-supporting portion proper, (indicated at 15.) The backs 16 of said seat portions rise to a suitable height, and are either formed in a single part, bent centrally to bring said backs nearly into parallelism, or they are formed separately and bolted together. The foot-pieces or bases 13 of these side frames rest upon the vehicle-frame in front and in rear of the axle, respectively.

The seat-frames may be made of any suitable material; but I prefer metal strips of proper elasticity, so that their resiliency shall answer the functions of the vehicle-springs ordinarily used.

Upon the side bars are attached steps 16 and 17, one to aid in ascending to the back and the other to the fore seat. These steps answer a double function, as they serve as props or rests for the vehicle when not in use.

What I claim is—

1. In a vehicle of the type described, the combination, with the vehicle-frame, of a seat-frame composed of similar side frames, each having a base, a seat-supporting portion, and a back, said parts being in duplicate in each frame and united by the backs, so that the seats shall lie upon both sides of the axle, substantially as described.

2. In a vehicle of the type described, the combination, with a vehicle-frame, of two open or skeleton seat-frames arranged upon the lateral bars of the vehicle-frame, the seats being arranged to face in opposite directions and to lie upon both sides of the axle, the backs of the seat-frames being united, substantially as described.

3. A one-wheeled vehicle consisting of a vehicle-frame, open or skeleton seat-frames united by their backs and arranged upon each side of the vehicle-frame, a rigid axle having conical or conoidal equalizing-supporters, a wheel having a hub of increased diameter, revolving between said supporters, and steps arranged to serve as props, also the hub of the wheel having an oil-opening closed by a screw-plug, substantially as described.

In testimony whereof I have hereunto set my hand and affixed my seal in presence of two subscribing witnesses.

HARRIETT D. T. WILSON. [L. S.]

Witnesses:
    BELLE L. BOGART,
    ARTHUR W. MEAD.